United States Patent [19]
Taber et al.

[11] Patent Number: 5,202,678
[45] Date of Patent: Apr. 13, 1993

[54] RECOGNITION UNIT

[75] Inventors: John E. Taber, Gardena; Bernard H. Dell, Hawthorne, both of Calif.

[73] Assignee: AIL Systems, Inc., Deer Park, N.Y.

[21] Appl. No.: 793,212

[22] Filed: Feb. 13, 1959

[51] Int. Cl.$^5$ .................... H03K 5/159; G08C 19/28
[52] U.S. Cl. .................... 328/119; 328/109; 340/825.58; 340/825.61; 340/825.69
[58] Field of Search ............ 250/27 PD, 27 F, 27 PC, 250/27 PS; 178/43.5; 179/15 APC, 1.5, 15.6; 340/352, 348, 164, 167, 170, 825.58, 825.59, 825.61, 825.64, 825.69; 328/109, 110, 118, 119; 375/87, 102

[56] References Cited
U.S. PATENT DOCUMENTS

| | | | |
|---|---|---|---|
| 2,706,810 | 4/1955 | Jacobson | 340/825.61 |
| 2,752,507 | 6/1956 | Dureau | 328/119 |
| 2,909,657 | 10/1959 | Aurell | 328/109 |
| 2,977,542 | 3/1961 | Lutz | 328/108 |

*Primary Examiner*—Gilberto Barrón, Jr.
*Attorney, Agent, or Firm*—C. H. Grace

[57] ABSTRACT

An electronic recognition unit indicates that a flow of received information is starting when a desired biphased pulsed ratio signal starts to be received. The recognition unit discriminates against both noise and spurious radio signals. Desired signals are made recognizable by reversing, upon transmission, the phase of the carrier for a prescribed pattern of pulses. This technique prevents responding to unqualified continuous-wave signals. The relative phases of adjacent radio-frequency pulses of the desired pulse train convey the recognition information. When the phases of two adjacent pulses are the same a positive audio-pulse output is obtained, and if their phases differ by 180 degrees the output is negative. For a predetermined number of pulses, for example fourteen, the resulting positive and negative audio pulses are added in an audio delay circuit with appropriate inversion of the sign of the intentionally negative pulses. The procedure produces relatively large recognition signals, only when the incoming pulse train has the prescribed phase pattern.

9 Claims, 2 Drawing Sheets

RECOGNITION UNIT

The present invention relates to communication systems in general and relates more particularly to a recognition unit adapted to both reliably identify a coded arrangement of bi-phase pulsed signals indicating the presence of a message and reliably discriminate against interference and noise that may otherwise give a false indication.

Automatic and semi-automatic communication systems generally require some means of conveying a positive indication from the transmitter to the receiver that the transmission of some useful information is to follow. In teletype systems, for example, this indication is simply a start baud which has proven satisfactory for its intended application. When a more positive indication is needed, such as with burst communication systems for which the duration of transmission is extremely short, a more elaborate means of recognition is needed. It is needed to insure that transmissions are rarely missed even though the signal-to-noise ratio is as small as the minimum useable value, while at the same time insuring that pulse recognitions due to interfering carriers and noise are reduced to a negligible value.

It is, therefore, an object of the present invention to provide a recognition unit for insuring that message transmissions are received even though the signal-to-noise ratio is as small as the minimum useable value.

It is another object of the present invention to provide a recognition unit that reduces to a negligible value the danger of false recognitions due to interfering carrier signals and noise.

It is a further object of the present invention to provide a recognition unit for reliably identifying a coded arrangement of bi-phase pulsed signals that indicate the presence of a message.

It is an additional object of the present invention to provide a recognition unit of the type above mentioned that is adaptable for the identification of both single and multi-channel signals.

According to the basic concept of the present invention, a recognition unit is provided to identify a train of radio-frequency pulses whose carriers are variously phased in accordance with a coded sequence of carrier phases. More particularly the present invention provides a recognition unit that is responsive to a train of pulses made unique by reversing the phase of the pulse carrier for prescribed pulses. This permits single-channel operation and inherently provides protection against continuous-wave interference. The relative phases of adjacent radio-frequency pulses of the pulse train convey the recognition information. An video-pulse train conveying the same information is obtained by comparing the phases of adjacent pulses of the train in a phase detector which may be of a character adapted to operate in response to a superheterodyne intermediate frequency signal version of the radio-frequency pulses. If the phases of the two pulses appearing in the phase detector are the same, an output pulse of positive polarity is obtained, while if the phases of the two pulses differ by 180°, a negative polarity output pulse is obtained instead. Time coincidence of adjacent pulses may be obtained by means of an intermediate-frequency delay line whose delay equals one pulse interval. To distinguish the train of polarized output pulses produced by the phase detector from trains of coded radio-frequency or intermediate-frequency carrier pulses, such train of polarized output pulses will hereinafter be referred to as a video-pulse train, albeit, the signal frequencies making up such video-pulse train may fall within any range of signal, frequencies.

The resulting positive and negative video-pulse train is then inserted in an video-delay line having a plurality of equally-spaced taps, the number of taps being equal to the number of pulses in the video-pulse train. These taps are divided into two groups such that when the video-pulse train is fully inserted in the delay line, positive voltages, corresponding to the positive pulses, appear simultaneously on one group of taps, and negative voltages, corresponding to negative pulses, appear simultaneously on the other group of taps. The voltages appearing at the positive taps are added in one network and the voltages appearing at the negative taps are added in another network, the two sums then being subtracted from each other in a difference circuit.

Thus, at the instant the video-pulse train is fully inserted in the video-delay line, a composite pulse many times the amplitude of a single pulse appears at the output of the difference circuit. At any other instant, or if noise or interference only are present, the output of the difference circuit is only a few times the amplitude of an individual pulse. Hence, by channeling the output of the difference circuit through an amplitude-sensitive threshold circuit, pulse trains having the proper phase relationships are positively identified. As an added precaution in making this identification, an amplitude limiter is inserted ahead of the video-delay line to prevent a small number of large-amplitude samples of noise or other interferring signals from summing to a value which exceeds the threshold amplitude.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
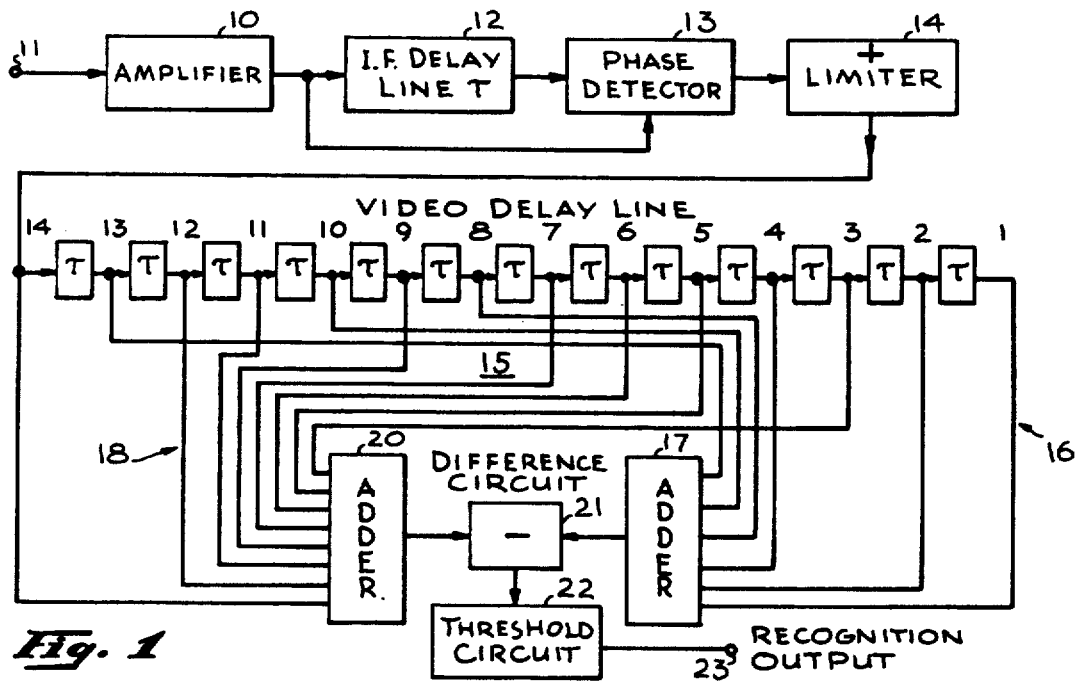
FIG. 1 shows a block diagram of a recognition unit according to the present invention.

Referring now to the drawings, there is shown in FIG. 1 a recognition unit which, in accordance with the present invention, identifies a recognition signal comprising a sequence of radio-frequency pulses coded according to a prescribed scheme, the recognition unit being adapted in accordance with the code scheme adapted to actuate a message recorder for recording a message normally following the recognition signal.

The coding scheme referred to involves establishing either an in-phase or an out-of-phase relationship between the carriers of adjacent pulses, the particular code to which the recognition unit is adapted being the particular sequence of such in-phase and out-of-phase carrier relationships. Such pulses comprise what may be conveniently termed bi-phased pulsed carrier signals. In view of the fact that the phase relationships may be permutated, it will be obvious that a relatively large number of codes are available. The recognition unit of the present invention is readily adaptable to any one of such codes. Hence, it should be emphasized at this point that the embodiment described below is only a particular adaptation of the recognition unit of the present invention and that by suitably modifying the described embodiment, other adaptations for other codes expressed by such bi-phased pulsed carrier signals may be provided within the scope of the invention.

As shown in FIG. 1, the recognition unit comprises an amplifier 10 connected between an input terminal 11 to which the recognition signal is applied and both an intermediate-frequency delay line 12 and a phase detector 13, the delay line being connected between the amplifier and the phase detector. With respect to delay line 12, the delay line delays each recognition pulse applied thereto by an interval of time equal to the pulse period, which is to say, that each pulse is delayed by an interval of time such that it coincides in time with the next succeeding pulse in the pulse train. As for phase detector 13, this circuit produces an output pulse whose polarity is dependent upon the relative phase relationship between the carriers of each pair of radio-frequency pulses applied to it. A limiter circuit 14 is connected to the output of phase detector 13 to provide a constant amplitude for the video pulses produced by the phase detector.

The recognition unit of the present invention further includes a video delay line, generally designated 15, comprising n−1 delay-line sections connected in tandem, where n is equal to the number of video pulses in the pulse train out of limiter 14. Since these delay-line sections are identical in every respect, it will be obvious that video delay line 15 includes n equally-spaced taps which are numbered 1 to 14 in the embodiment shown in FIG. 1, the specific number of delay-line sections and taps in any adaptation of the present invention being dependent upon the number of pulses in the recognition signal. Thus, for purposes of illustration, the recognition signal employed herein is taken to comprise a train of fifteen radio-frequency pulses from which a train of fourteen video pulses is developed at the output of phase detector 13, as will be explained in detail below. Hence, video delay line 15 herein includes thirteen delayline sections indicated in the figure by the Greek letter $\tau$ and, therefore, also includes fourteen output taps numbered 1 to 14 as previously mentioned. However, it must be emphasized that theoretically any number of recognition pulses may be used in the recognition signal and, therefore, that video delay line 15 must be adapted as to the number of delay-line sections and taps in accordance with the number of such recognition pulses selected.

Taps 1 to 14 are divided into two groups such that when a fourteen-pulse recognition sequence is fully inserted in the delay line, positive voltages, corresponding to the positive pulses, appear simultaneously on one group of taps, and negative voltages, corresponding to the negative pulses, appear simultaneously on the other group of taps. The particular division of the taps into two groups is not rigidly fixed but depends upon the particular code employed, that is to say, it depends upon the phase relationship between each pair of successive radio-frequency pulses in the recognition signal. In other words, the number of taps as well as which taps are included in one of the two groups will vary as the coding is varied. As will be seen later when the operation of the present invention is taken up for discussion, the coding herein has been so selected that taps 1, 2, 4, 8, 10, and 13 constitute a first group of taps and taps 3, 5, 6, 7, 9, 11, 12, and 14 constitute a second group of taps.

The first group of taps, namely, taps 1, 2, 4, 8, 10, and 13, are connected via a corresponding number of lines, generally designated 16, to a first adder circuit 17. Similarly, the second group of taps, namely, taps 3, 5, 6, 7, 9, 11, 12, and 14, are connected via a corresponding number of lines, generally designated 18, to a second adder circuit 20. Of this latter group of taps, tap 14, which constitutes the input end of delay line 15, is also connected to the output of limiter circuit 14. A difference circuit 21 having first and second input terminals is respectively connected between said first and second adders 17 and 20, the output end of difference circuit 21 being connected to a threshold circuit 22. The output of the recognition unit is produced at an output terminal 23 to which threshold circuit 22 is connected.

Figure 2:
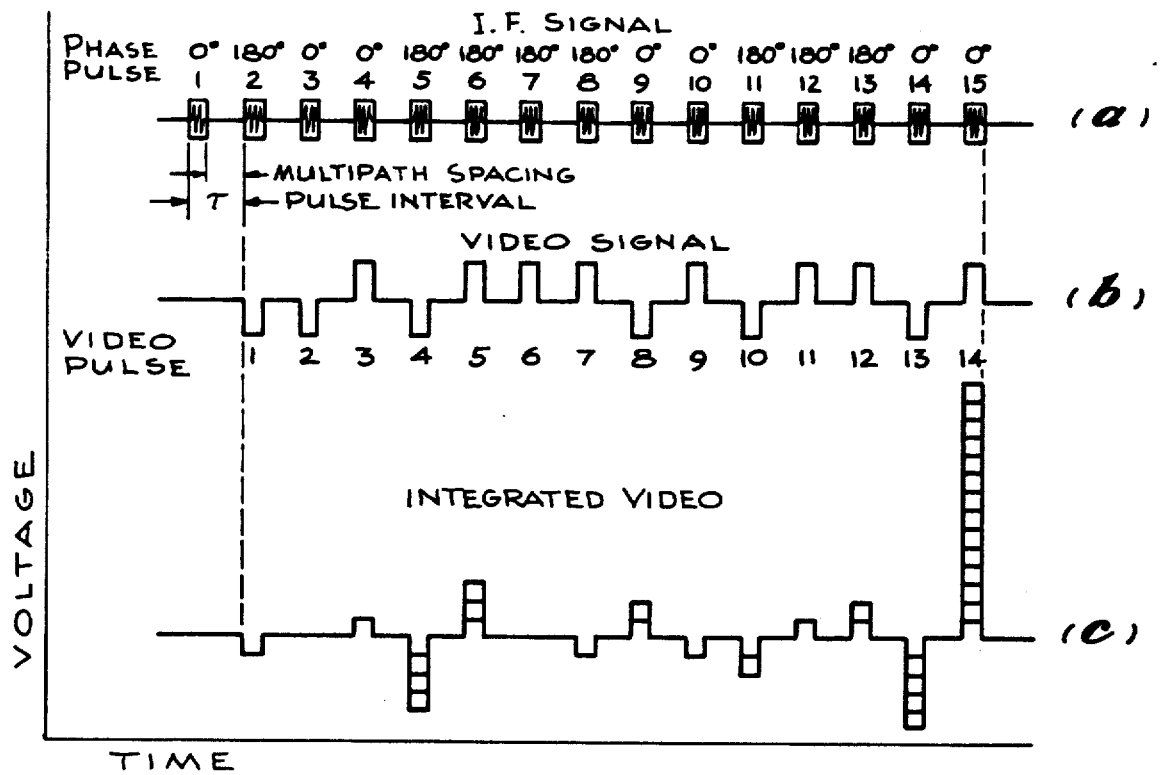
FIG. 2 is a flow chart of the pulse trains appearing at various points in the embodiment of FIG. 1.

In considering the operation, reference is first made to FIG. 2 and, in particular, to part (a) therein wherein is shown a recognition signal that is representative of the large number of recognition signals made possible by varying the coding scheme. The recognition unit shown in FIG. 1 is adapted to receive and identify a recognition signal having the code arrangement of the recognition signal illustrated in part (a) of FIG. 2.

As shown therein, the recognition signal is a pulse train comprising a plurality of fifteen radio-frequency pulses spaced equally apart from each other in time, the sequence in which the pulses occur being indicated above the pulses by numbers 1 to 15 inclusive. The period or pulse interval is indicated below the pulse train by the Greek letter $\tau$. The phase of the radio-frequency energy of each pulse or, stated differently, of the carrier of each of the pulses, relative to that of pulse 1 used as a reference is indicated above the pulse signal designation. The indication consists in indicating whether the carriers are in phase or out of phase with the reference carrier, and this is done by placing either a 0° or a 180° legend above the pulse number. Pulse 4, for example, has a 0° mark above it and, therefore, its carrier is in phase with the carrier of pulse 1 whereas the carrier of pulse 5 is completely out of phase with the carrier of pulse 1 as indicated by the 180° mark above the figure 5. The sequence in which the carriers are phased relative to the reference carrier constitutes the particular coding arrangement being utilized.

Accordingly, when a recognition signal as described above is received by the recognition unit at input terminal 11, the signal is amplified by amplifier 10 which then passes the recognition signal both to intermediate-frequency delay line 12 and phase detector 13, the output from the delay line also being passed to the phase detector. More specifically, delay line 12 delays each pulsed carrier signal applied to it by an interval of time equal to the pulse period so that, except for the interval of time between pulses 1 and 2, two successively received pulses are always applied simultaneously to phase detector 13. Thus, for example, pulse 1, when received, is applied simultaneously to both delay line 12 and phase detector 13. However, due to the fixed delay experienced by pulse 1 in delay line 12, only one pulse, namely, pulse 1 appears at the two inputs to the phase detector. As a result, no output signal is produced by phase detector 13 at this time. However, when pulse 2 is received by the recognition unit, pulse 2 is also applied simultaneously to delay line 12 and phase detector 13 and, since pulse 1 has previously been delayed by an interval of time equal to that between pulses 1 and 2, pulses 1 and 2 are simultaneously applied to the phase detector wherein the carrier phases of the two pulses are compared. In this way, the carrier defining the first occurring pulse of any pair of successive pulses acts as a reference carrier against which the phase of the carrier defining the second occurring pulse of that pair is compared. Thus, phase detector 13 produces an video pulse at its output whose polarity depends upon the phase relationship between the two pulses compared therein, a positive video pulse being obtained if the phases of the two pulses compared in the phase detector are the same and a negative video pulse being obtained if the phases of the two pulses differ by 180°. In the comparison made between pulses 1 and 2, a negative video pulse would be produced at the output of phase detector 13. By so comparing the phases of the carriers of adjacent pairs of pulses, that is, pulses 2 and 3, pulses 3 and 4, pulses 4 and 5, etc., a train of fourteen video pulses is produced by phase detector 13 whose polarities will vary between positive and negative in accordance with the phase comparisons made as described above. The train of video pulses is shown in part (b) in FIG. 2 and it will be noticed from a comparison of the part (a) and part (b) pulse trains that the video-pulse train is in time coincidence with pulses 2 through 15 of the recognition pulse train. As shown, the individual pulses of the video-pulse train are numbered 1 to 14 inclusive.

This video-pulse train is applied to limiter circuit 14 which limits the amplitude of the pulses to a predetermined value so that the pulse train appearing at the output of the limiter circuit is of the same absolute magnitude throughout. After being limited, the train of video pulses is applied to video delay line 15 wherein each pulse is incrementally delayed according to its position in the pulse sequence when the pulse train is fully inserted in the delay line. More particularly, each increment of time delay is equal to the pulse period, the first pulses in the train experiencing the longest delay and the last pulses in the train experiencing the shortest delay. Thus, after pulse 1 has been subjected to thirteen increments of delay, the video-pulse train will be fully inserted in video delay line 15, pulse 1 appearing at tap 1, pulse 2 appearing at tap 2 . . . and pulse 14 appearing at tap 14. By referring to the pulse train in part (b) of FIG. 2 and to video delay line 15 in FIG. 1, it will be seen at once that positive video pulses 3, 5, 6, 7, 9, 11, 12 and 14 will appear at the identically numbered taps in the delay line and that negative pulses 1, 2, 4, 8, 10 and 13 will also appear at the identically numbered taps.

Consequently, the positive voltages at taps 1, 2, 4, 8, 10 and 13 are applied via lines 16 to adder 17 wherein these voltages are added to produce an output voltage therefrom whose amplitude corresponds to the sum of the amplitudes of the pulses applied to the adder. Similarly, the negative voltages at taps 3, 5, 6, 7, 9, 11, 12 and 14 are applied via lines 18 to adder circuit 20 wherein they are also added to produce another output voltage whose amplitude also corresponds to the sum of the amplitudes of the voltages applied thereto. These two voltage sums are then subtracted from each other in difference circuit 21 with the result that at the instant the fourteenpulse train is fully inserted in delay line 15, a composite pulse corresponding in amplitude to fourteen times the amplitude of a single pulse appears at the output of the difference circuit. It should be noted here that at any other instant, or if noise or interference only are present, the output of the difference circuit is only a few times the amplitude of an individual pulse. The output of difference circuit 21 is shown in part (c) of FIG. 2 and as shown therein the pulse of greatest amplitude, namely, pulse 14, is produced only when the video pulse train of part (b) is fully inserted in delay line 15.

The output of difference circuit 21 is applied to amplitude-sensitive threshold circuit 22 and if the amplitude of the output of the difference circuit is of sufficient magnitude as mentioned above, a recognition pulse is applied by the threshold circuit to output terminal 23 for actuating a message recorder which records the message normally following the recognition signal. In FIG. 2 part (c), pulse 14 will be of sufficient magnitude to trigger threshold circuit 22 to produce a recognition pulse. Thus, pulse trains having the proper phase relationships are positively identified. In conclusion, it should be mentioned with respect to limiter circuit 14 that the limiter acts as an added precaution in making the identification in that it prevents a small number of large-amplitude samples of noise or interfering signals from summing to a value which exceeds the threshold amplitude.

Figure 3:
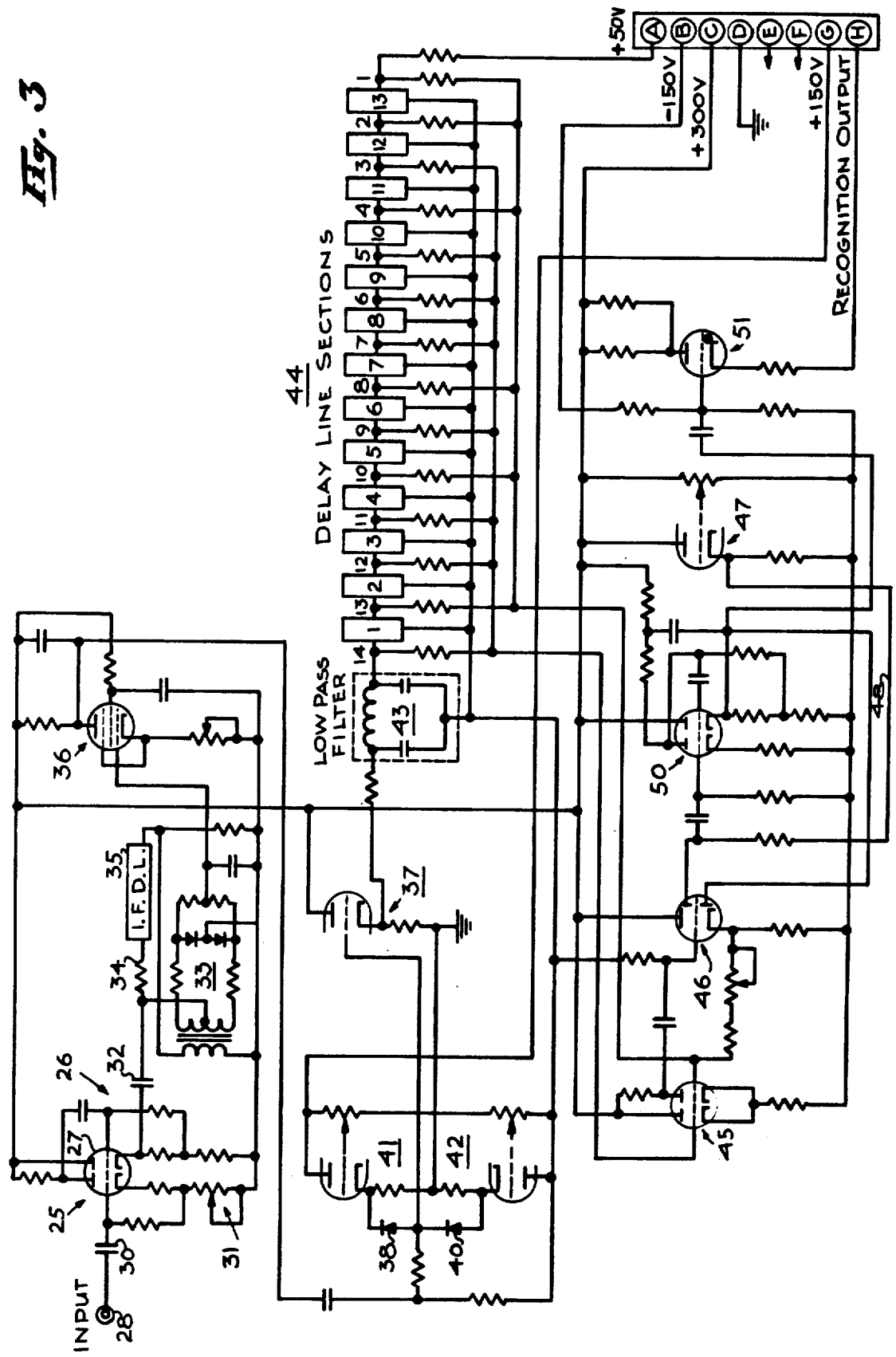
FIG. 3 shows a detailed schematic circuit of the embodiment shown in FIG. 1.

Referring now to FIG. 3, there is shown a detailed schematic circuit of the embodiment shown in block form in FIG. 1. As shown, the recognition unit comprises a standard amplifier generally designated 25, and a standard cathode follower circuit, generally designated 26, the amplifier and the cathode follower having a common twin triode 27, the first half of which is devoted to amplifier 25 and the second half of which is devoted to cathode follower 26. The recognition signal is received by amplifier 25 via an input terminal 28 to which the recognition signal is applied, the signal thereafter being coupled to the amplifier through a coupling capacitor 30. A potentiometer, generally designated 31, is included in the cathode circuit of amplifier 25 and serves as a gain control. From a comparison of FIGS. 1 and 3, it will readily be seen that amplifier 25 and cathode follower 26 of FIG. 3 together correspond to amplifier 10 in FIG. 1 and, similarly, that input terminals 28 and 11 also correspond.

The output of cathode follower circuit 26 is coupled by means of a coupling capacitor 32 to a phase detector circuit, generally designated 33, and through a resistor 34 to an intermediate-frequency delay line 35 which is preferably a constant k, band-pass filter. The over-all delay of this line at its center frequency is equal to the transmitted pulse repetition interval of the recognition signal. Here again, a correspondence respectively exists between phase detectors 13 and 33 and delay lines 12 and 35 of FIGS. 1 and 3.

Phase detector 33 is connected at its output end to an amplifier, generally designated 36, which, in turn, is coupled to a cathode follower circuit, generally designated 37, the coupling being by way of positive and negative clipping diodes 38 and 40, respectively, whose function it is to limit the amplitude of excessively large signals. The reference potential for these diodes is provided by a pair of cathode followers, generally designated 41 and 42, as shown in the figure. It will be obvious that the combination of diodes 38 and 40 with cathode followers 41 and 42 forms a limiter circuit of the type used as limiter 14 in FIG. 1.

Cathode follower 37 drives a low-pass filter, generally designated 43, which removes undesired high-frequency components that may have been generated in the clipping circuits. The output of low-pass filter 43, which is preferably a constant-k pi-section, is connected directly to a video delay line, generally designated 44, which includes thirteen equal sections numbered 1 to 13 as shown, the time delay per section being the period between pulses, that is, the aforementioned repetition pulse interval. Low-pass filter 43 and delay line 44 of FIG. 3 constitute delay line 15 in FIG. 1.

Since there are thirteen sections of delay line 44, there are fourteen taps available corresponding to fourteen pulse positions, the taps being numbered 1 to 14 as shown in the figure. Taps 1, 2, 4, 8, 10 and 13 are respectivly coupled through six resistors to the first input of a difference amplifier, generally designated 45, these six resistors of FIG. 3 being adder 17 in FIG. 1. Similarly, taps 3, 5, 6, 7, 9, 11, 12 and 14 are respectively coupled through a corresponding number of resistors to the second input of difference amplifier 45, these seven resistors being adder 20 in FIG. 1. The output end of the difference amplifier is then coupled to a threshold circuit, generally designated 46. Indicating again the correspondence between FIGS. 1 and 3, difference amplifier 45 and threshold circuit 46 respectively correspond to difference amplifier 21 and threshold circuit 22.

The threshold level of circuit 46 is set by adjusting the cathode voltage of a cathode follower circuit, generally designated 47, the coupling between the two circuits being accomplished by means of a lead line 48 connecting the two circuits as shown. The output of threshold circuit 47 is applied to a pulse generator, generally designated 50, whose output terminal, in turn, is coupled to a thyratron pulse-forming circuit, which is generally designated 51. Although not shown, it is deemed worth while to mention that a recorder actuator and timer is connected in the cathode circuit of thyratron circuit 51 and is triggered when the thyratron is fired. The recorder actuator provides the current for the solenoid which starts the magnetic recorder which records the transmitted message signal following the recognition signal. The timer controls the duration of magnetic recording so that, after a pre-set time, the timer extinguishes thyratron circuit 51 by opening its cathode circuit, thereby re-setting the recorder actuator and timer.

As was previously mentioned, the circuit of FIG. 3 is merely the circuit of FIG. 1 but in greater detail. Accordingly, the operation of the circuit of FIG. 3 is the same as that previously delineated as the operation of the circuit of FIG. 1, with the result that no further description of the operation in connection with FIG. 3 is deemed necessary here.

Having thus described the invention, what is claimed as new is:

1. A recognition unit for identifying a train of biphase pulsed carrier signals defining a series of n pulses at a predetermined pulse repetition frequency, said unit comprising: delay means for delaying each pulsed carrier signal by an interval of time substantially equal to a pulse period; phase detector means coupled to said delay means and receptive of the train of pulsed carrier signals for comparing the relative phase between the carrier of each pulsed carrier signal with that of the next preceding pulsed carrier signal to produce a corresponding train of bi-polar video pulses, a video pulse of one polarity being produced when the compared carriers are in phase and a video pulse of opposite polarity being produced when the compared carriers are out of phase; a video delay line receptive of said video pulse train and having an input tap and a plurality of output taps the sum of said input and output taps being equal in number to n-1, the time delay between each pair of adjacent taps being equal to the pulse period of the video pulses; a first adder circuit coupled to those of said taps whereat the video pulses are of said one polarity, said first adder circuit simultaneously summing said video pulses to produce a first pulse having said one polarity; a second adder circuit coupled to those of said taps whereat the video pulses are of said opposite polarity, said second adder circuit simultaneously summing said video pulses to produce a second pulse having said opposite polarity; and a difference circuit for subtracting said second pulse from said first pulse to produce an output pulse having said one polarity.

2. A recognition unit for identifying a train of biphase pulsed carrier signals defining a series of n pulses at a predetermined pulse repetition frequency, said unit comprising: delay means for delaying each pulsed carrier signal by an interval of time substantially equal to a pulse period; phase detector means coupled to said delay means and receptive of the train of pulsed carrier signals for comparing the relative phase between the carrier of each pulsed carrier signal with that of the next preceding pulsed carrier signal to produce a corresponding train of bi-polar video pulses, a video pulse of one polarity being produced when the compared carriers are in phase and a video pulse of opposite polarity being produced when the compared carriers are out of phase; a limiter circuit coupled to said phase detector means to limit the amplitude of signals therethrough to a predetermined voltage level; a video delay line coupled to said limiter circuit for receiving the limited video pulse train, said delay line having an input tap and a plurality of output taps the sum of said input and output taps being equal in number to n-1, the time delay between each pair of adjacent taps being equal to the pulse period of the video pulses; a first adder circuit coupled to those of said taps whereat the video pulses are of said one polarity, said first adder circuit simultaneously summing said video pulses to produce a first pulse having said one polarity; a second adder circuit coupled to those of said taps whereat the video pulses are of said opposite polarity, said second adder circuit simultaneously summing said video pulses to produce a second pulse having said opposite polarity; a difference circuit for subtracting said second pulse from said first pulse to produce an output pulse having said one polarity; and a normally inoperable threshold circuit coupled to said difference circuit, said threshold circuit being rendered operable to produce an actuating pulse in response to a signal whose amplitude is at least equal to a specified threshold voltage, whereby said threshold circuit conditionally produces an actuating pulse in response to said output pulse.

3. A recognition unit for identifying a train of n pulsed carrier signals having a fixed pulse repetition frequency, the pulsed carriers being either in phase or out of phase with each other in accordance with a predetermined coding scheme, said unit comprising: first means for comparing the carriers of the Xth and (X−1)st pulsed carrier signals as to phase, where X is an integer varying from 1 to n, said means being operable in response to said phase comparisons to produce a train of n−1 video pulses whose polarities respectively depend upon the relative phasing of compared carriers, a video pulse having one polarity when the compared carriers are in phase and an opposite polarity when the compared carriers are out of phase; second means for simultaneously summing the amplitudes of video pulses having said one polarity and simultaneously summing the amplitudes of video pulses having said opposite polarity to respectively produce first and second coincident pulses of opposing polarity; and third means for subtracting said second pulse from said first pulse to produce an output pulse having said one polarity and a voltage amplitude equal to at least a predetermined threshold voltage corresponding to a predetermined minimum number of pulsed carrier signals.

4. The recognition unit defined in claim 3 wherein said first means includes delay means for delaying the Xth pulsed carrier signal by an interval of time equal to a pulse period; and phase detector means coupled to said delay means and receptive of the train of pulsed carrier signals for comparing the carriers of the Xth and (X−1)st pulsed carrier signals as to phase, said phase detector means producing a video pulse of one polarity when the carriers of the Xth and (X−1)st pulsed carrier signals are in phase and a video pulse of opposite polarity when said compared carriers are out of phase, thereby to produce a train of n−1 video pulses.

5. The recognition unit defined in claim 3 wherein said second means includes a delay line receptive of said video pulse train and having n−1 taps therealong, the time delay between each pair of adjacent taps being equal to the pulse period of the video pulses; a first adder circuit coupled to those of said taps whereat the video pulses are of said one polarity, said first adder circuit simultaneously summing said video pulses to produce a first pulse having said one polarity; and a second adder circuit coupled to those of said taps whereat the video pulses are of said opposite polarity, said second adder circuit simultaneously summing said video pulses to produce a second pulse having said opposite polarity.

6. A recognition unit for identifying a train of n pulsed carrier signals having a fixed pulse repetition frequency, the pulsed carrier signals being either in phase or out of phase with each other in accordance with a predetermined coding scheme, said unit comprising: delay means for delaying the Xth pulsed carrier signal by an interval of time equal to a pulse period; phase detector means coupled to said delay means and receptive of the train of pulsed carrier signals for comparing the carriers of the Xth and (X−1)st carrier signals as to phase, where X is an integer between 1 and n said phase detector means producing a video pulse of one polarity when the carriers of the Xth and (X−1)st pulse carrier signals are in phase and a video pulse of opposite polarity when said compared carriers are out of phase, thereby to produce a train of n−1 bi-polar video pulses; a delay line receptive of said video pulse train and having n−1 taps therealong, the time delay between each pair of adjacent taps being equal to the pulse period of the video pulses; a first adder circuit coupled to those of said taps whereat the video pulses are of said one polarity when said train of video pulses is first fully inserted in said delay line, said first adder circuit simultaneously summing said video pulses to produce a first pulse having said one polarity; and a second adder circuit coupled to those of said taps whereat the video pulses are of said opposite polarity when said train of video pulses is first fully inserted in said delay line, said second adder circuit simultaneously summing said video pulses to produce a second pulse having said opposite polarity.

7. A recognition unit for identifying a train of n pulsed carrier signals having a fixed pulse repetition frequency, the pulsed carrier signals being either in phase or out of phase with each other in accordance with a predetermined coding scheme, said unit comprising: delay means for delaying the Xth pulsed carrier signal by an interval of time equal to a pulse period; phase detector means coupled to said delay means and receptive of the train of pulsed carrier signals for comparing the carriers of the Xth and (X−1)st carrier signals as to phase, where X is an integer between 1 and n said phase detector means producing a video pulse of one polarity when the carriers of the Xth and (X−1)st pulse carrier signals are in phase and a video pulse of opposite polarity when said compared carriers are out of phase, thereby to produce a train of n−1 bi-polar video pulses; a limiter circuit coupled to said phase detector means to limit the amplitude of signals therethrough to a predetermined voltage level; a video delay line coupled to said limiter circuit for receiving the limited video pulse train, said delay line having a plurality of taps equal in number to the number of video pulses in said video pulse train, the time delay between each pair of adjacent taps being equal to the pulse period of the video pulses; a first adder circuit coupled to those of said taps whereat the video pulses are of said one polarity when said train of video pulses is first fully inserted in said delay line, said first adder circuit simultaneously summing said video pulses to produce a first pulse having said one polarity; a second adder circuit coupled to those of said taps whereat the video pulses are of said opposite polarity when said train of video pulses is first fully inserted in said delay line, said second adder circuit simultaneously summing said video pulses to produce a second pulse having said opposite polarity; and a normally inoperable threshold circuit coupled to said difference circuit, said threshold circuit being rendered operable to produce an actuating pulse in response to a signal whose amplitude is at least equal to said threshold voltage, said threshold circuit producing an actuating pulse in response to said output pulse.

8. A recognition unit for identifying coded trains of bi-phased pulsed carrier signals, each train comprising a series of n uniformly spaced-apart bursts of a carrier signal with each of said bursts representing one of two selected versions of the carrier signal, each of said versions bearing a 180° electrical phase relationship with respect to the other, said unit comprising: first means for comparing the phase of each burst of carrier signal with the phase of a later-occurring burst of carrier signal to produce, in correspondence with each train of bi-phased pulsed carrier signals, a train of bi-polar video pulses less than n in number, a video pulse of one polarity being produced when the phases of the bursts compared are in agreement and a video pulse of opposite polarity being produced when the phases of the bursts compared are in disagreement; and means coupled to said first means for developing an output signal only in response to a video pulse train having a specified number of pulses of one polarity interspersed in a specified fashion with a specified number of pulses of opposite polarity.

9. A recognition unit for identifying coded trains of bi-phased pulsed carrier signals, each train comprising a series of n uniformly spacedapart bursts of a carrier signal with each of said bursts representing one of two selected versions of the carrier signal, each of said versions bearing a 180° electrical phase relationship with respect to the other, said unit comprising: first means for comparing the phase of each burst of carrier signal with the phase of a later-occurring burst of carrier signal to produce, in correspondence with each train of bi-phased pulsed carrier signals, a train of bi-polar video pulses less than n in number, a video pulse of one polarity being produced when the phases of the bursts compared are in agreement and a video pulse of opposite polarity being produced when the phases of the bursts compared are in disagreement; means coupled to said first means for developing a first output signal the amplitude of which represents the summation, over a period corresponding to the duration of each video pulse train, of the respective amplitudes of selected ones of the video pulses comprising said train which are of said one polarity and a second output signal the amplitude of which represents the summation, over the same period, of the respective amplitudes of selected ones of said video pulses which are of said opposite polarity; means for combining said first and second output signals to produce a third output signal the amplitude of which is proportional to the sum of the absolute magnitudes of said first and second output signals; and means coupled to said last-named means for developing a fourth output signal only in response to the development of a third output signal the amplitude of which exceeds a specified minimum value.

* * * * *